(12) United States Patent
Rachakonda

(10) Patent No.: US 6,976,047 B1
(45) Date of Patent: Dec. 13, 2005

(54) SKIPPED CARRY INCREMENTER FOR FFT ADDRESS GENERATION

(75) Inventor: Ramana V. Rachakonda, Portland, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 651 days.

(21) Appl. No.: 10/108,401

(22) Filed: Mar. 28, 2002

(51) Int. Cl.[7] .............................................. G06F 17/14
(52) U.S. Cl. ....................................... 708/404; 708/672
(58) Field of Search ................................ 708/404, 672

(56) References Cited

U.S. PATENT DOCUMENTS

| | | | |
|---|---|---|---|
| 4,393,457 A | 7/1983 | New ........................... | 364/726 |
| 4,689,762 A | 8/1987 | Thibodeau, Jr. et al ..... | 364/726 |
| 5,012,441 A * | 4/1991 | Retter ........................ | 711/217 |
| 5,091,875 A * | 2/1992 | Wong et al. ................. | 708/404 |
| 5,430,667 A | 7/1995 | Takano ....................... | 364/726 |
| 5,491,652 A | 2/1996 | Luo et al. .................... | 364/726 |
| 5,555,517 A * | 9/1996 | Agrawal et al. ............ | 708/672 |
| 5,991,788 A | 11/1999 | Mintzer ...................... | 708/622 |
| 6,035,313 A * | 3/2000 | Marchant .................... | 708/404 |

* cited by examiner

Primary Examiner—D. H. Malzahn

(57) ABSTRACT

A method and apparatus are used to generate FFT data addresses for a butterfly stage based upon a computation stage value. The method includes setting a selected bit of a binary word at a logical value, performing an addition operation by adding a logical "1" to the binary word, and skipping a carry bit as selected by a one-hot decoded stage value during the addition operation. The apparatus includes consecutive adders configured to store a binary value and perform an addition operation on the binary value, multiplexers configured to select either the carry out output of the current consecutive half adder or the carry out output of the previous consecutive half adder as the carry in input of a next consecutive adder, and sets of logic gates that provide one bit of the data address.

21 Claims, 4 Drawing Sheets

| | STAGE 3 | | | STAGE 2 | | | | STAGE 1 | | | |
|---|---|---|---|---|---|---|---|---|---|---|---|
| | "A" (dec) | "A" (bin) | "B" (dec) | "B" (bin) | "A" (dec) | "A" (bin) | "B" (dec) | "B" (bin) | "A" (dec) | "A" (bin) | "B" (dec) | "B" (bin) |
| STEP 1 | 0 | 0000 | 4 | 0100 | 0 | 0000 | 2 | 0010 | 0 | 0000 | 1 | 0001 |
| STEP 2 | 1 | 0001 | 5 | 0101 | 1 | 0001 | 3 | 0011 | 2 | 0010 | 3 | 0011 |
| STEP 3 | 2 | 0010 | 6 | 0110 | 4 | 0100 | 6 | 0110 | 4 | 0100 | 5 | 0101 |
| STEP 4 | 3 | 0011 | 7 | 0111 | 5 | 0101 | 7 | 0111 | 6 | 0110 | 7 | 0111 |

SKIPPED CARRY INCREMENTER FOR FFT ADDRESS GENERATION

BACKGROUND OF THE INVENTION

1. Field of the Invention

The present invention relates to a Fast Fourier Transform (FFT) address generator, and more particularly to an FFT address generator that can generate addresses for a broad range of FFT sizes and can support hardware parallelism.

2. Description of the Related Art

The Discrete Fourier Transform (DFT) is the decomposition of a sampled signal in terms of sinusoidal components. If the signal is a function of time, such decomposition results in a frequency domain signal. The DFT is a fundamental digital signal processing algorithm used in many applications, including frequency domain processing and frequency analysis.

Because of its computational requirements, the DFT algorithm is usually not used for real time signal processing. Research has developed more efficient ways to compute the DFT by exploiting its symmetry and periodicity properties in order to significantly lower its computational requirements. The resulting algorithms are known collectively as Fast Fourier Transforms (FFTs). The FFT algorithm is based on the decomposition of the DFT computation. There are two decomposition approaches: decimation-in-time (DIT) and decimation-in-frequency (DIF).

The FFT is one of the most important algorithms in digital signal processing (DSP) applications. An FFT processor system mainly consists of two parts: the butterfly processor for arithmetic operation and an address generator for the generation of read/write addresses. The address generator provides addresses for the operation data for each butterfly calculation. As is known, the FFT butterfly computation operates on data in sets of r points, where r is called the radix. A P-point FFT uses P/r computation steps per computation stage for $\log_r P$ stages. Each computation step requires two data values out of the set of data points. The computational result of one butterfly stage is the input data of the next butterfly stage.

SUMMARY

In accordance with the present invention, a method and apparatus is provided to generate the FFT data addresses from which data would be fetched for a computation step of a computation stage. The method and apparatus in accordance with the present invention performs FFT addressing for a broad range of address FFT sizes and supports hardware parallelism. The FFT addressing scheme is ideally suited for, but not limited to, field programmable gate array (FPGA) or application specific integrated circuit (ASIC) implementations that require efficient address generation over a broad range of FFT sizes.

A method in accordance with the present invention generates FFT data addresses by sequentially adding a logical "1" to a binary word, while skipping the carry of a selected bit. This selected "set" bit is set at either a logical "0" or a logical "1" to generate the two data addresses for the butterfly operation. The skipped carry is then passed to the next consecutive bit. The position of the selected bit is determined by a one-hot decoded value, or control word, for the current computation stage.

One implementation of an apparatus to calculate addresses using the method described includes consecutive adders configured to store a binary value and perform an addition operation on the binary value. The adders are configured to provide a carry out output and a sum out output. The apparatus also includes a means for selecting the carry out output of a current consecutive half adder or the carry out output of a previous consecutive half adder as the carry in input of a next consecutive half adder, and a means for providing an output with a logical value equal to a sum out output of a half adder or equal to a predetermined value.

BRIEF DESCRIPTION OF THE DRAWINGS

Details of the present invention will appear more clearly from the following description in which the preferred embodiment of the invention has been set forth in conjunction with the drawings in which.

DETAILED DESCRIPTION

Figure 1:
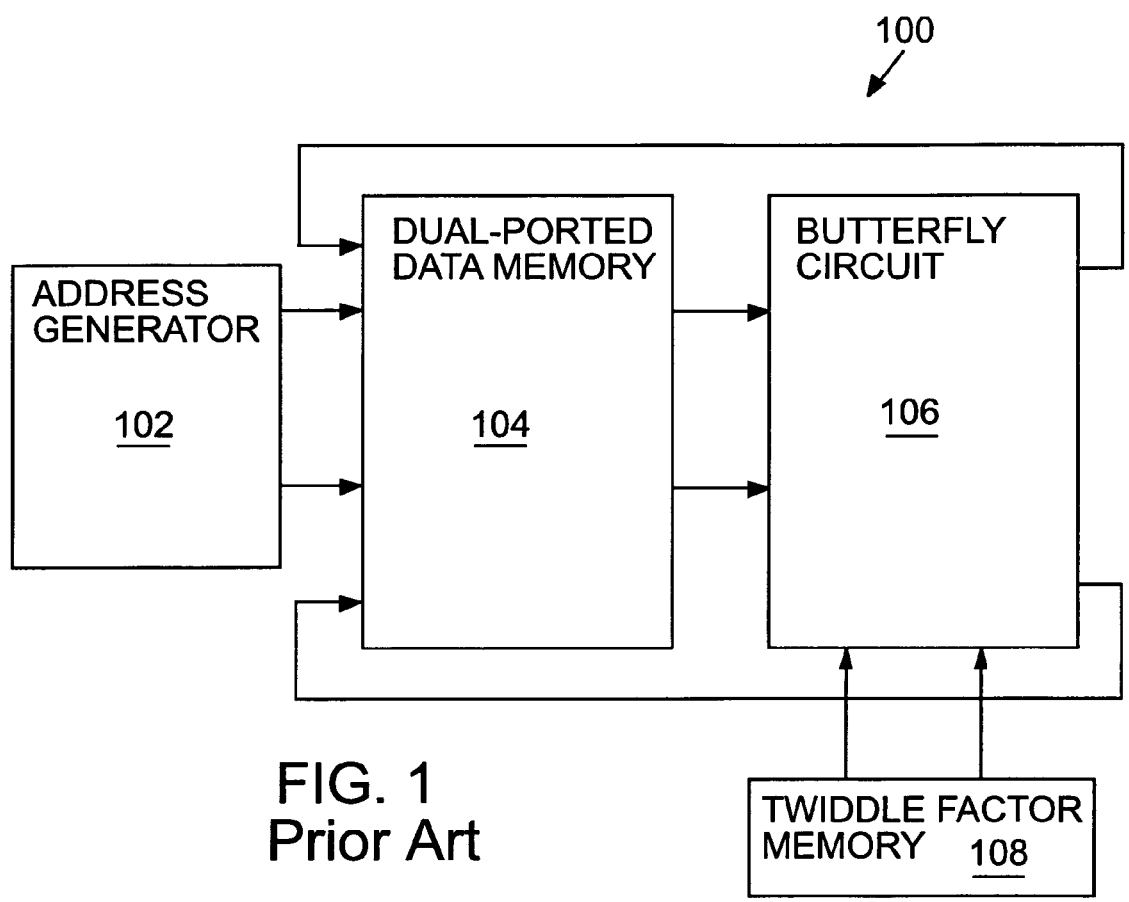
FIG. 1 is a block diagram depicting a typical FFT hardware implementation.

FIG. 1 is a block diagram depicting a typical FFT circuit 100. Address generator 102 generates two data address that are transmitted to dual-ported memory 104. In this manner, address generator 102 generates two data addresses in parallel so that butterfly circuit 106 can obtain two data points simultaneously. FFT circuit 100 further comprises twiddle factor memory 108. Twiddle factor memory 108 supplies coefficients to the butterfly circuit 106, which are used by butterfly circuit 106 to perform the FFT computation.

Figures 2, 3:
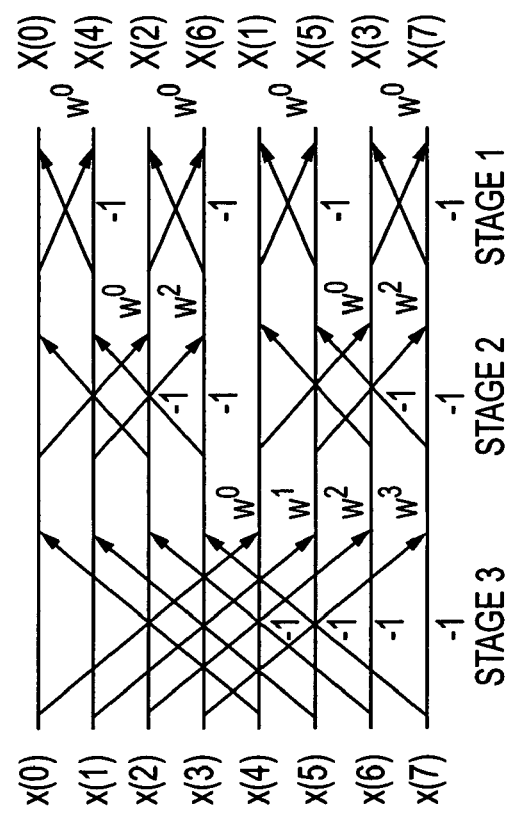
FIG. 2 depicts a table describing a method in accordance with the present invention.
FIG. 3 depicts a typical 8-point FFT operation.

FIG. 2 depicts a table describing a method for generating addresses in accordance with the present invention in context of an 8-point radix-2 FFT. The method can be applied to generate addresses for an any-point FFT. As shown in FIG. 2, the 8-point FFT has three butterfly stages (stage 1–stage 3) and each stage includes four computation steps (step 1–step 4). FIG. 2 also depicts the "A" data addresses and the "B" data addresses in both decimal and binary form. The "A" and "B" data addresses are the two data addresses from which data would be fetched for each step of a butterfly stage, as shown in FIG. 3. For example, with reference to FIGS. 2 and 3, the "A" data addresses for stage 2 comprise x(0), x(1), x(4) and x(5), while the "B" data addresses comprise x(2), x(3), x(6) and x(7).

The method of generating data addresses will now be discussed with reference to FIG. 2. The method in accordance with the present invention generates the "A" and "B" data addresses by sequentially adding a logical "1" to a binary word, while skipping the carry of a selected bit. This selected "set" bit is set at either a logical "0" or a logical "1". The skipped carry is then passed to the next consecutive bit. The position of the selected bit is determined by a one-hot decoded value, or control word, for the current stage. Specifically, stage 3 corresponds to control word 0100, stage 2 corresponds to control word 0010, and stage 1 corresponds to control word 0001. Hence, $bit_2$ is set for stage 3, $bit_1$ is set for stage 2, and $bit_0$ is set for stage 1.

As an example, the "A" addresses ($a_3\ a_2\ a_1\ a_0$) for steps 1–4 of stage 2 are generated as follows. As explained above, $bit_1$ ($a_1$) is set for stage 2 (as indicated in bold in FIG. 2). The binary word corresponding to the "A" address for step 1 is initially set at 0 (0000). The "A" addresses for steps 2–4 are generated by freezing bit $a_1$ at a logical "0" and sequentially adding a logical "1" to the binary word of the previous step. Because bit $a_1$ is set, the carry bit passed to bit $a_1$ during the addition operation skips bit $a_1$, and is instead added to bit $a_2$. Thus, the "A" address generated for step 2 is 1 (0001), which is the sum of the "A" address of step 1 (0000) and a logical "1", with bit $a_1$ set at "0" and the carry for bit $a_1$ passed to bit $a_2$. Likewise, the "A" address for step 3 is 4 (0100), and the "A" address for step 4 is 5 (0101).

As a further example, the generation of the "B" addresses ($b_3\ b_2\ b_1\ b_0$) for steps 1–4 of stage 2 will be explained. The binary word corresponding to the "B" address for step 1 is initially set at 2 (0010), which corresponds to word 0000 with bit $b_1$ set at "1". The "B" addresses for steps 2–4 are generated by freezing bit $b_1$ at a logical "1" and sequentially adding a logical "1" to the binary word of the previous step. With bit $b_1$ set, the carry bit passed to bit $b_1$ during the addition operation skips bit $b_1$, and is instead added to bit $b_2$. Thus, the "B" address for step 2 is 3 (0011), which is the sum of the "B" address of step 1 (0010) and a logical "1", with bit $b_1$ set at "1" and the carry for bit $b_1$ passed to bit $b_2$. Likewise, the "B" address for step 3 is 6 (0110), and the "B" address for step 4 is 7 (0111).

The method in accordance with the present invention operates in the same manner to produce "A" and "B" addresses for stage 1 and stage 3, with the difference being the bit of the binary word to be set. As explained above, $bit_0$ is set for stage 1 and $bit_2$ is set for stage 3 (as indicated in bold in FIG. 2).

Figure 4:
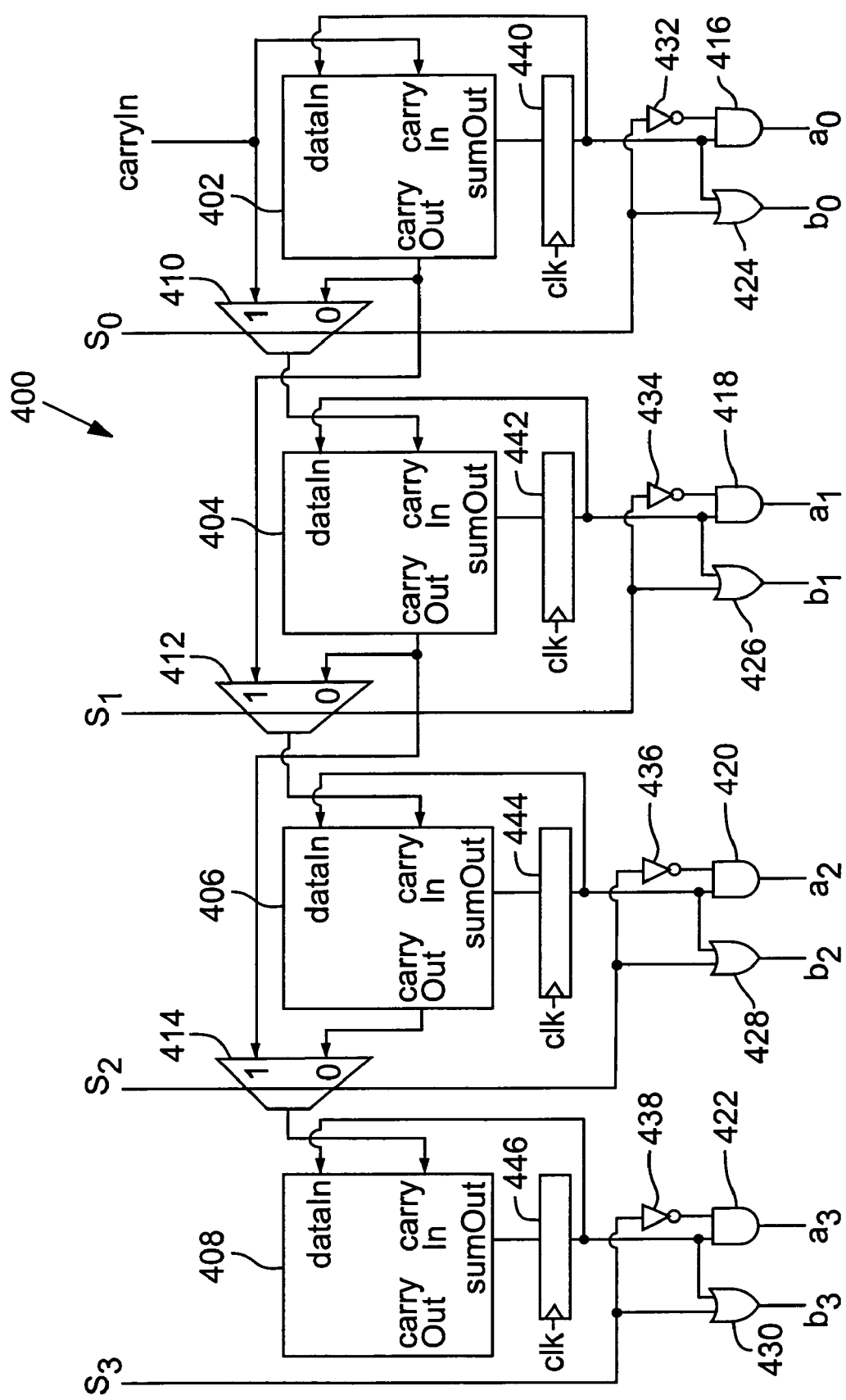
FIG. 4 is a block diagram depicting an address generator in accordance with the present invention.

FIG. 4 depicts one embodiment of address generator 400 used for generating addresses in accordance with the present invention. Address generator 400 comprises four consecutive half adders (402, 404, 406 and 408) coupled with registers (440, 442, 444, 446). Address generator 400 produces "A" and "B" addresses comprised of four bits, but can be modified to produce addresses of any size. Each half adder receives as inputs carryIn and dataIn and provides as outputs carryOut and sumOut. The sumOut output of each half adder is passed to a register (440, 442, 444 or 446) for storage, and is fed back to the half adder as its dataIn input. Half adder 402 receives its carryIn input directly, while the carryIn input for the remaining half adders is received through a multiplexer (410, 412, or 414). Each multiplexer is controlled by a select bit ($s_0$, $s_1$, $s_2$ or $s_3$), which corresponds to a one-hot decoded value of the present stage. The outputs of address generator 400 ($a_0$–$a_3$, $b_0$–$b_3$) comprise address bits of the "A" data address and the "B" data address. Each output is passed through logic gates, which operate to set a selected bit at a logical "0" or a logical "1", as will be explained below.

The operation of address generator 400 will now be discussed with reference to generating an "A" and "B" address for stage 2, step 3. In this example, it is assumed that in the previous cycle (step 2), phase generator 400 produced 0001 as the "A" address and 0011 as the "B" address (see FIG. 2), and these values were stored in registers 440, 442, 444, and 446. In order to produce the next set of data addresses for step 3, phase generator 400 adds a logical "1" to the stored "A" and "B" addresses of step 2. As such, the carryIn input to half adder 402 is set at "1".

As explained above, during the addition operation, one bit is selected to be set at a logical "0" for the "A" address and at a logical "1" for the "B" address. The bit selected to be set is determined by a one-hot decoded value, or control word, for the current stage. Therefore, stage 2 corresponds to a control word 0010. This decoded value 0010 is provided to address generator 400 as select bits $s_0$–$s_3$. Thus, select bit $s_1$ is set at "1", while select bits $s_0$, $s_2$ and $s_3$ are all set at "0".

Half adder 402 adds its sumOut output from the previous step (a logical "1" stored in register 440) with its carryIn input (a logical "1"). Thus, for step 3, half adder 402 provides a "1" as its carryOut output and a "0" as its sumOut output. Bit $s_0$ and the sumOut output are passed through gate 424 and gates 432 and 416 in order to produce output address bits $a_0$ ("0") and $b_0$ ("0"). Because bit $s_0$ is set at "0", multiplexer 410 selects the carryOut output of half adder 402 as the input carryIn of the next consecutive half adder 404.

Half adder 404 adds its sumOut output from the previous step ("0" stored in register 442) with its carryIn input ("1"). Therefore, half adder 404 provides a "0" as its carryOut output and a "1" as its sumOut output. Bit $s_1$ and the sumOut output are passed through gate 426 and gates 434 and 418 in order to produce output address bits $a_1$ ("0") and $b_1$ ("1"). With bit $s_1$ set at "1", and the logical configuration of the gates 426, 432 and 418, the output address bits $a_1$ and $b_1$ are set at a logical "0" and a logical "1", respectively, for all four steps of stage 2. Further, because bit $s_1$ is set at "1", multiplexer 412 selects the carryOut output of half adder 402 as the carryIn input for the next half adder 406. In this manner, the carry bit from half adder 402 skips half adder 404, which has its output bits set, and is provided to half adder 406.

Half adder 406 adds its sumOut output from the previous step ("0" stored in register 444) with its carryIn input ("1") received from half adder 402. Therefore, half adder 406 provides a "0" as its carryOut output and a "1" as its sumOut output. Bit $s_2$ and the sumOut output are passed through gate 428 and gates 436 and 420 in order to produce output address bits $a_2$ ("1") and $b_2$ ("1"). With bit $s_2$ set at "0", multiplexer 414 selects the carryOut output of half adder 406 as the carryIn input for the next half adder 408. Lastly, half adder 408 adds its sumOut output from the previous step ("0" stored in register 446) with its carryIn input ("0"). Half adder 408 thus provides a "0" as its sumOut output. Bit $s_3$ and the sumOut output are passed through gate 430 and gates 438 and 422 in order to produce output address bits $a_3$ ("0") and $b_3$ ("0").

Address generator 400 therefore provides as its outputs an "A" data address of 4 (0100) and a "B" data address of 6 (0110) for stage 2, step 3. Again, with reference to FIG. 2, the "A" data address 0100 comprises the sum of the "A" address of step 2 (0001) and a logical "1", with bit $b_1$ set at "0" and the carry for bit $b_1$ passed to bit $b_2$. The "B" data address 0110 comprises the sum of the "B" address of step 2 (0011) and a logical "1", with bit $b_1$ set at "1" and the carry for bit $b_1$ passed to bit $b_2$. Address generator 400 operates in the same manner to produce "A" and "B" addresses for steps 1–4 of stage 1 and stage 3, with the difference being the bit of the binary word to be set. $Bit_0$ is set for stage 1 and $bit_2$ is set for stage 3.

In accordance with an embodiment of the invention, address generator 400 can be pre-loaded for initialization. For example, address generator 400 can provide a data address for any stage and any step within that stage, without needing to perform the addition operations for previous steps. This creates the capability to have more than one address generator running in parallel to produce several pairs of addresses to feed multiple parallel butterfly engines. In accordance with other embodiments, address generator 400 can be used to generate only "A" addresses or only "B" addresses. In addition, the logic gates show in FIG. 4 can be replaced with equivalent logic gates that produce the same logical result as the gates shown in FIG. 4.

Figure 5:
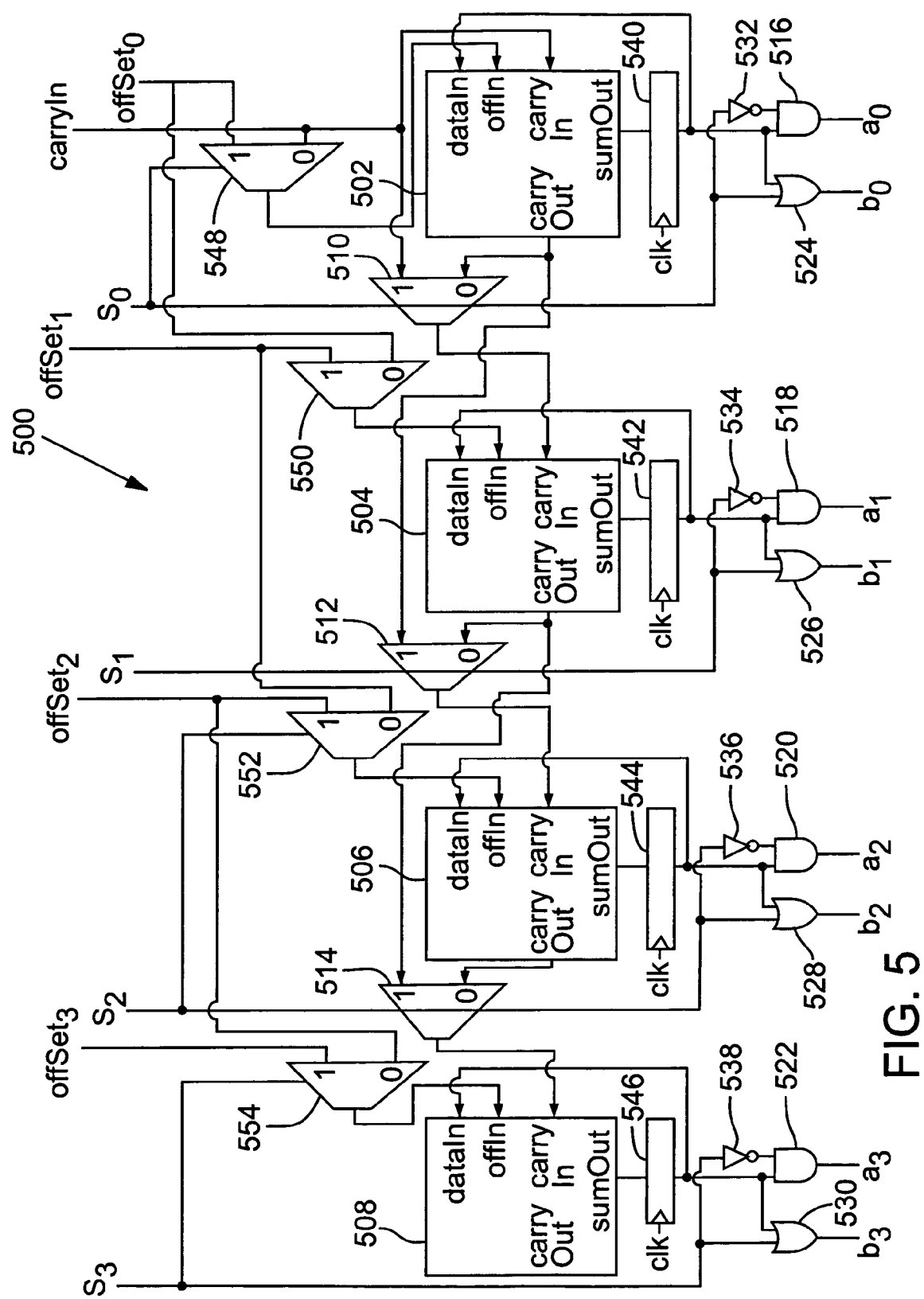
FIG. 5 is a block diagram depicting an address generator in accordance with the present invention.

The address generator in accordance with the present invention can also be modified to skip consecutive data addresses, and thus can be used in parallelizing the generation of addresses. Such a modification is depicted in FIG. 5. Address generator 500 of FIG. 5 includes full adders 502, 504, 506, and 508. Each of the full adders receives an additional input offIn from multiplexers 548, 550, 552, and 554. Multiplexers 550, 552, and 554 receive as inputs a current bit of an offset number and a previous bit of an offset number. For example, for an offset of 0110, multiplexer 550 receives as inputs the current bit offSet$_1$ ("1") and the previous bit offSet$_0$("0"). (Multiplexer 548 as the initial multiplexer receives as inputs a current offset bit and a carryIn bit.) Multiplexers 548, 550, 552, and 554 are controlled by a select bit ($s_0$, $s_1$, $s_2$ or $s_3$), which corresponds to a one-hot decoded value of the present stage. The remainder address generator 500 is similar in configuration to address generator 400 of FIG. 4.

The use of full adders with an offset input, as shown in FIG. 5, permits address generator 500 to generate addresses out of sequence, and allows the address generator to skip consecutive addresses. Instead of sequentially adding a logical "1" to a binary number, address generator 500 can use the offset input to add an additional value to the binary number, and thus skip over one or a number of addresses in the sequence.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of generating data addresses for an FFT computation, wherein the computation has several stages with several steps within each stage, comprising:
    entering a computation stage;
    providing a binary word;
    setting the value of a selected bit in the word, whose position in the word is determined by the stage entered;
    providing the binary word with the selected bit set as an address for the first computation step; and
    for each subsequent step of the stage, providing another address by changing the value of the binary word while maintaining the value of the set bit.

2. The method of claim 1 wherein setting the value of the selected bit comprises logically combining a binary word with a control word whose value is determined by the computation stage.

3. The method of claim 1 wherein maintaining the value of the selected bit comprises logically combining a binary word with a control word whose value is determined by the computation stage.

4. The method of claim 1 wherein the position of the selected bit in the word is determined by the number of the computation stage.

5. The method of claim 1 wherein changing the value binary word comprises incrementing its value.

6. The method of claim 1 wherein changing the value of the binary word comprises adding a logical "1" to the word.

7. The method of claim 1 wherein changing the value of the binary word comprises skipping the selected bit in favor of an adjacent bit whenever the selected bit would otherwise have been changed.

8. A method for generating FFT data addresses, the method comprising the steps of:
    performing sequential additions to a binary word, each addition comprising the steps of:
        setting a selected bit of the binary word at a first binary value for a current FFT butterfly stage;
        adding a second binary value to the binary word;
        skipping a carry bit passed on to the selected bit such that the carry bit is passed on to a next consecutive bit of the binary word after the selected bit;
        passing subsequent carry bits to a next consecutive bit of the binary word; and
        providing a sum of an addition as a binary word for a next sequential addition;
    and using results of the sequential additions as data addresses to determine location of data for an FFT butterfly stage for performing a butterfly operation on data.

9. The method according to claim 8, wherein the first binary value equals "0".

10. The method according to claim 8, wherein the first binary value equals "1".

11. The method according to claim 8, wherein the position of the selected bit is determined from a one-hot decoded value of the current FFT butterfly stage.

12. The method according to claim 8, including passing the data addresses to a dual-ported memory.

13. A method for generating a first and second sequence of FFT data addresses in parallel, the method comprising the steps of:
    generating the first sequence of data addresses by performing sequential additions to one copy of a binary word, each addition comprising the steps of:
        setting a selected bit of the binary word at a logical "0" for a current FFT butterfly stage;
        adding a binary value to the binary word;
        skipping a carry bit passed on to the selected bit such that the carry bit is passed on to a next consecutive bit of the binary word after the selected bit;
        passing subsequent carry bits to a next consecutive bit of the binary word; and
        providing a sum of an addition as a binary word for a next sequential addition; and
    generating the second sequence of data addresses by performing sequential additions to another copy of the binary word, each addition comprising the steps of:
        setting a selected bit of the binary word at a logical "1" for a current FFT butterfly stage;
        adding a binary value to the binary word;
        skipping a carry bit passed on to the selected bit such that the carry bit is passed on to a next consecutive bit of the binary word after the selected bit;
        passing subsequent carry bits to a next consecutive bit of the binary word; and
        providing a sum of an addition as a binary word for a next sequential addition;
    and using results of the sequential additions as data addresses to determine location of data for an FFT butterfly stage for performing a butterfly operation on data.

14. The method according to claim 13, wherein the position of the selected bit is determined from a one-hot decoded value of the current FFT butterfly stage.

15. The method according to claim 13, including passing first and second sequence of data addresses to a dual-ported memory.

16. An address generator for an FFT comprising:
registers;
consecutive adders configured to receive a stored binary value from a corresponding register and a carry in input and add the carry in input to the stored binary value, and configured to provide a sum out output for storage in the corresponding register and a carry out output;
multiplexers operable to receive the carry out output of a current consecutive adder or the carry out output of a previous consecutive adder, and operable to receive an input select bit, and configured to select the carry out output of the current consecutive adder or the carry out output of the previous consecutive adder as the carry in input of a next consecutive adder; and
sets of logic gates each operably coupled to one register, wherein each set of logic gates receives a stored sum out output from the register and a corresponding input select bit, and wherein each set of logic gates is configured to provide an output with a logical value equal to one of the stored sum out output and a predetermined value.

17. The address generator of claim 16, wherein the input select bit comprises of one bit of a one-hot decoded value of a current FFT butterfly stage.

18. The address generator of claim 16, wherein each of the sets of logic gates comprises:
an AND gate operable to receive the sum out output and an inverted value of the corresponding input select bit; and
an OR gate operable to receive the sum out output and the corresponding input select bit.

19. The address generator of claim 16, wherein the adders comprise half adders.

20. The address generator of claim 16, wherein the adders comprise full adders configured to receive an offset input and add the offset input to the stored binary value.

21. The address generator of claim 20, further comprising additional multiplexers operable to receive as inputs a current bit of the offset input and a previous bit of the offset input, and operable to receive an input select bit comprised of one bit of a one-hot decoded value of a current FFT butterfly stage, and configured to select the current bit of the offset input or the previous bit of the offset input as the offset input of a next consecutive adder.

* * * * *